United States Patent [19]

Hamada et al.

[11] Patent Number: 5,233,457
[45] Date of Patent: Aug. 3, 1993

[54] BEAM SCANNING OPTICAL SYSTEM

[75] Inventors: Akiyoshi Hamada; Hiromu Nakamura, both of Toyokawa, Japan

[73] Assignee: Minolta Camera Kabushiki Kaisha, Osaka, Japan

[21] Appl. No.: 752,284

[22] Filed: Aug. 29, 1991

[30] Foreign Application Priority Data

Aug. 30, 1990 [JP] Japan ................ 2-230201
Aug. 30, 1990 [JP] Japan ................ 2-230202
Aug. 30, 1990 [JP] Japan ................ 2-230203

[51] Int. Cl.⁵ .......................... G02B 26/08
[52] U.S. Cl. .................. 359/216; 359/711; 346/108; 250/235
[58] Field of Search ............ 359/205-207, 359/212-215, 708, 710, 711, 208, 216-218, 219; 250/235-236; 346/108, 160

[56] References Cited

U.S. PATENT DOCUMENTS

| | | | |
|---|---|---|---|
| 3,520,586 | 7/1970 | Bousky | 359/208 |
| 4,585,296 | 4/1986 | Mimoura et al. | 359/711 |
| 4,941,719 | 7/1990 | Hisada et al. | 359/205 |
| 4,984,858 | 8/1991 | Kuroda | 359/217 |
| 5,031,979 | 7/1991 | Itabashi | 359/711 |
| 5,093,745 | 3/1992 | Kuroda | 359/217 |
| 5,173,798 | 12/1992 | Naiki | 359/216 |

FOREIGN PATENT DOCUMENTS 3644124 11/1988 Fed. Rep. of Germany.

Primary Examiner—Bruce Y. Arnold
Assistant Examiner—James Phan
Attorney, Agent, or Firm—Price, Gess & Ubell

[57] ABSTRACT

A beam scanning optical system having a semiconductor laser for emitting a light beam; a cylindrical lens for converging the laser beam into a straight line; a polygon mirror for deflecting the laser beam which converged the cylindrical lens at a constant angular velocity; a spherical mirror for collecting the deflected laser beam on a surface of a photosensitive member; and a lens disposed between the polygon mirror and the spherical mirror, the lens having at least one toroidal surface. The lens is so disposed that its beam entrance side and beam exit side are decentered in a direction of the beam scanning, and curvature of the entrance side and curvature of the exit side on a plane of deflection have different centers. The entrance side and the exit side of the lens are a toroidal surface and a spherical surface respectively, and the spherical surface is decentered in a direction perpendicular to the plane of deflection in respect to the toroidal surface. Also, the spherical mirror is decentered in a direction perpendicular to the plane of deflection.

28 Claims, 7 Drawing Sheets

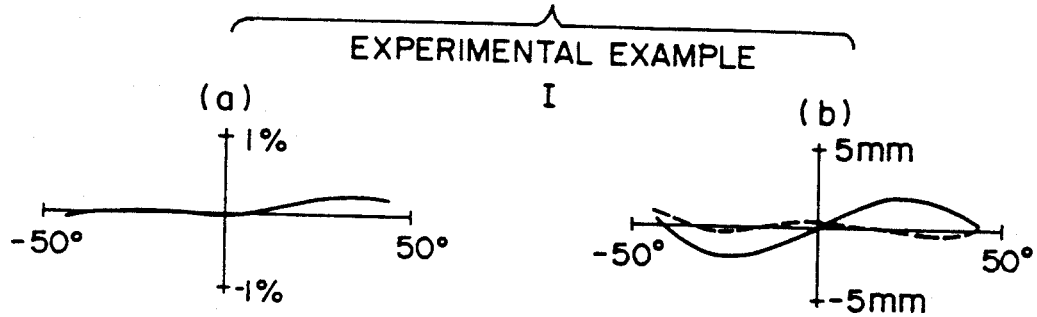
FIG. 7 EXPERIMENTAL EXAMPLE I
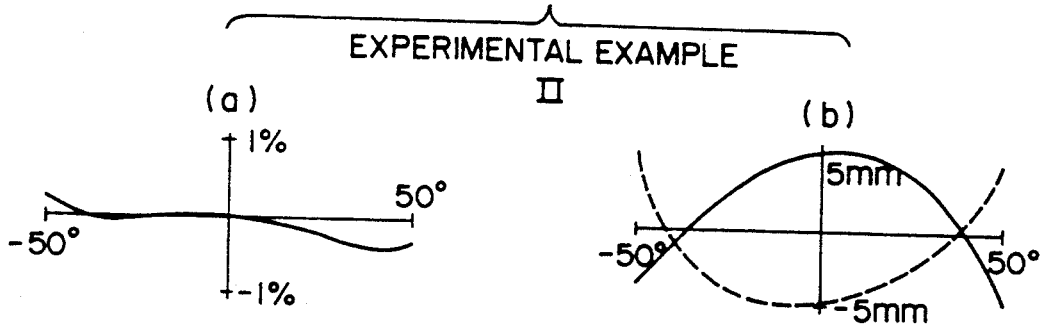
FIG. 8 EXPERIMENTAL EXAMPLE II
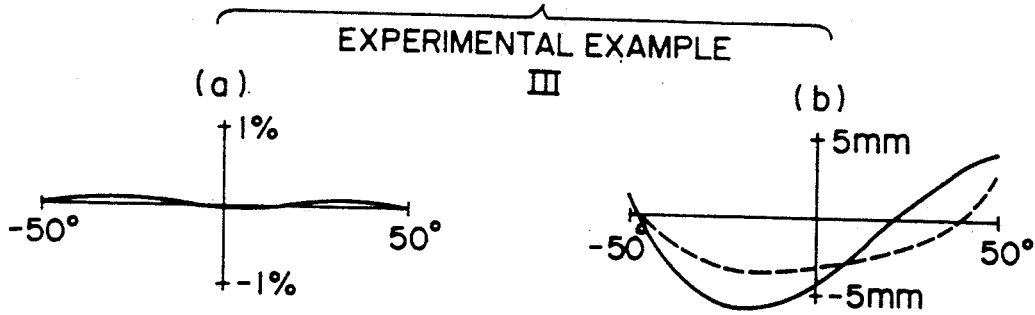
FIG. 9 EXPERIMENTAL EXAMPLE III
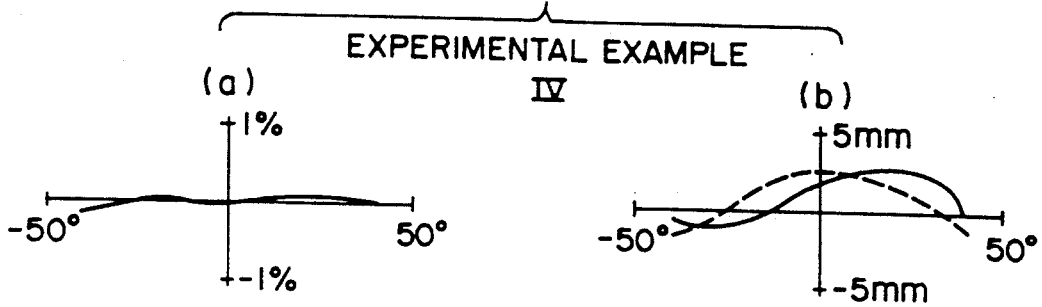
FIG. 10 EXPERIMENTAL EXAMPLE IV

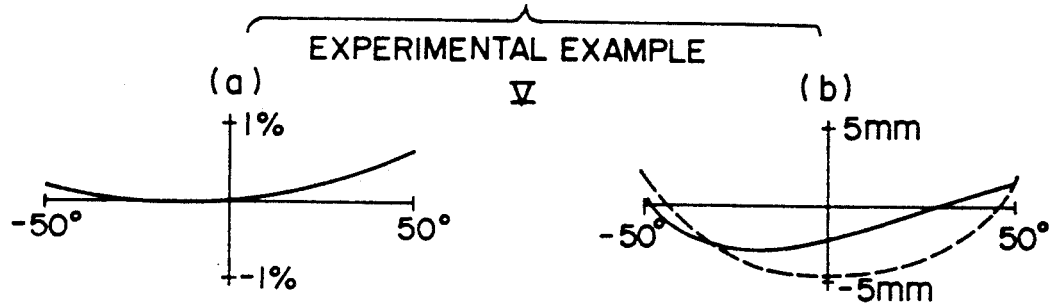
FIG. 11 EXPERIMENTAL EXAMPLE V
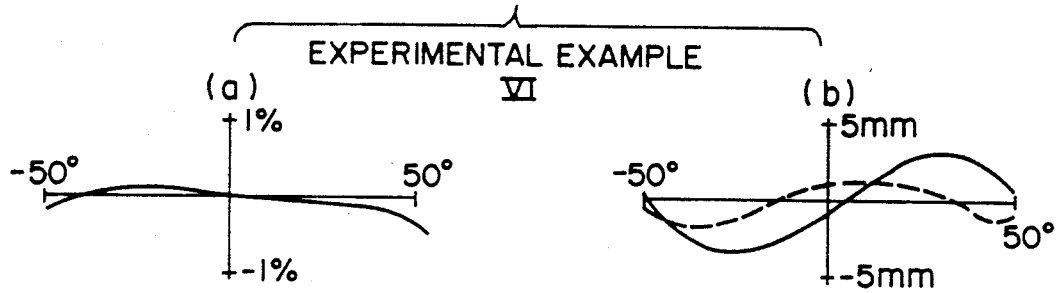
FIG. 12 EXPERIMENTAL EXAMPLE VI
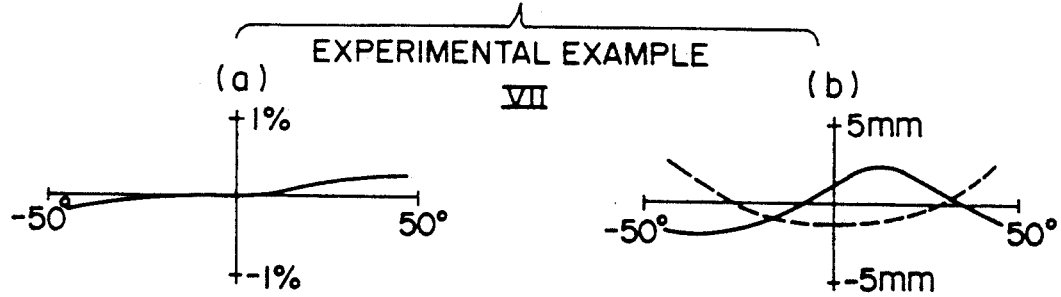
FIG. 13 EXPERIMENTAL EXAMPLE VII
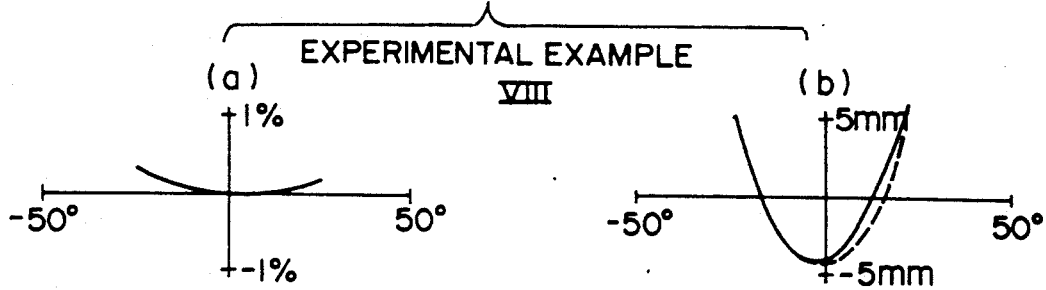
FIG. 14 EXPERIMENTAL EXAMPLE VIII

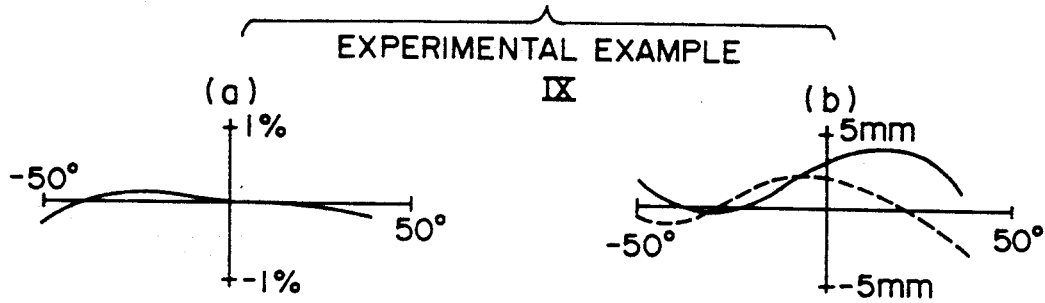
FIG. 15 EXPERIMENTAL EXAMPLE IX
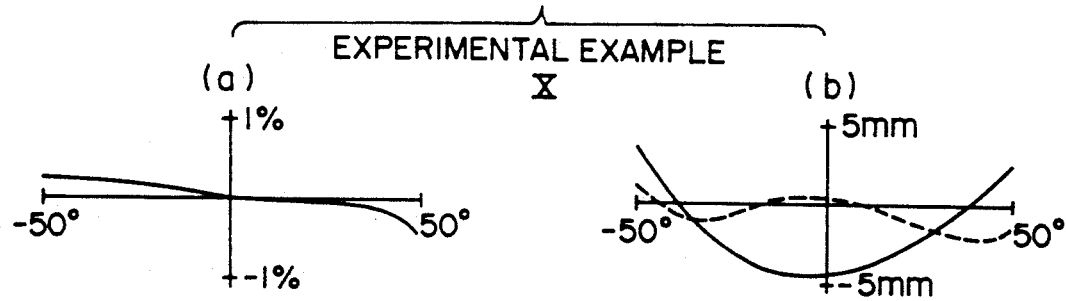
FIG. 16 EXPERIMENTAL EXAMPLE X
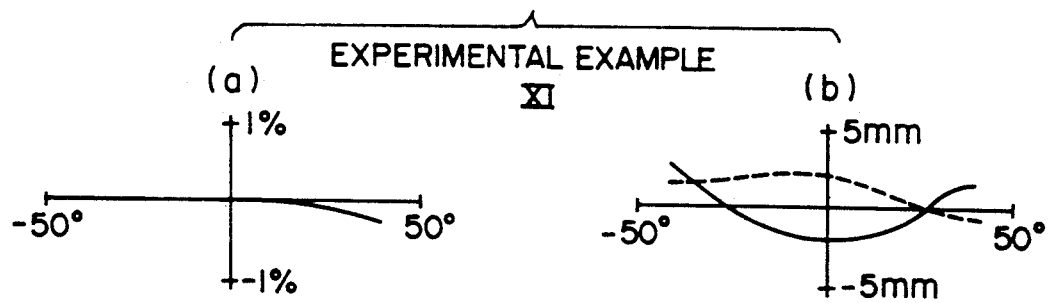
FIG. 17 EXPERIMENTAL EXAMPLE XI

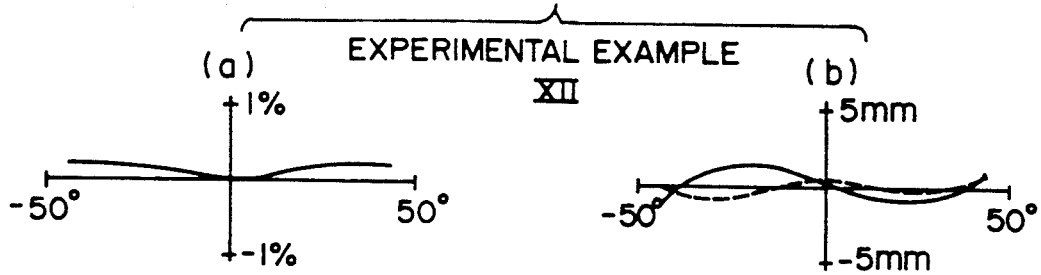
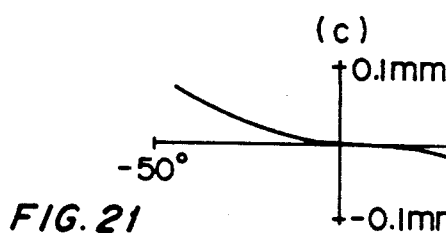
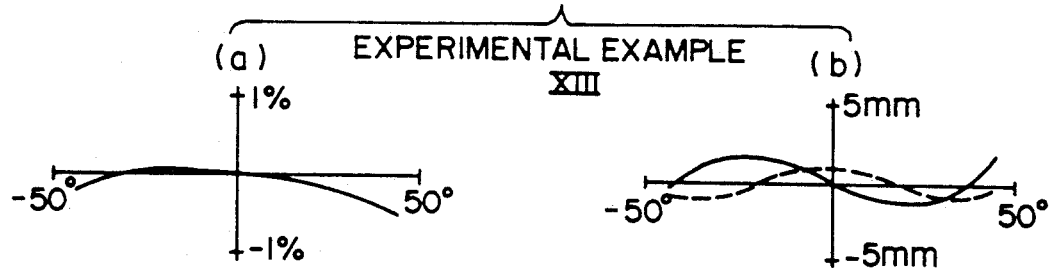
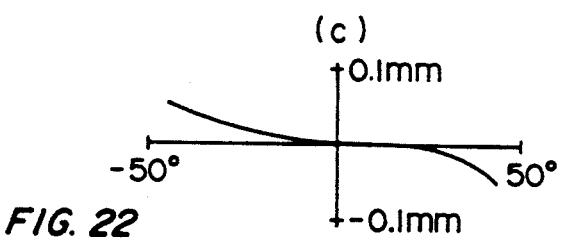
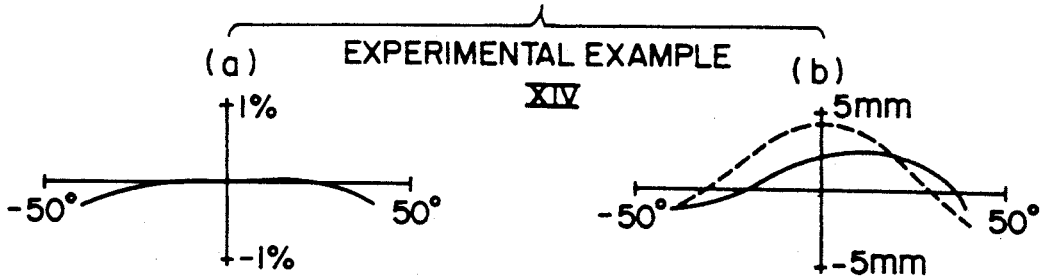
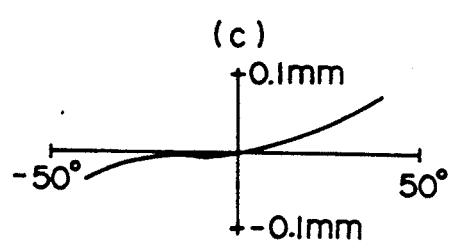

BEAM SCANNING OPTICAL SYSTEM

BACKGROUND OF THE INVENTION

1. Field of the Invention

The present invention relates to a beam scanning optical system, and more particularly to a beam scanning optical system which is employed in a laser beam printer, a facsimile or the like in order to collect a pencil of rays on a surface of an image medium.

2. Description of Related Art

Generally, a beam scanning optical system suitable for installation in a laser beam printer or a facsimile consists mainly of a semiconductor laser, a deflector such as a polygon mirror and, an fθ lens. The deflector is to deflect a pencil of rays emitted from the semiconductor laser at a constant angular velocity, which results in beam scanning (main-scanning). With no optical elements after the deflector, scanning speed varies within a main-scanning line on a beam receiving surface, and quality pictures cannot be obtained. The fθ lens is provided in order to prevent such variation in scanning speed. The fθ lens is made by combining various concave lenses and convex lenses, and planning such a lens is very complicated. From a viewpoint of manufacture, since there are many surfaces to be ground, it is very hard to improve accuracy, and accordingly the cost is expensive. Moreover, there is a limitation in selecting a material, that is, a light-transmitting material must be selected.

Because of the disadvantages above, it has been proposed to replace the fθ lens with an elliptical mirror or a parabolic mirror. However, such mirrors are difficult to manufacture with high manufacturing accuracy.

In view of the problems above, the applicants disclosed in U.S. Pat. No. 4,984,858 an optical system containing a spherical mirror which can be easily manufactured with high accuracy, not an fθ lens conventionally proposed mirrors. This arrangement makes the optical system compact, and inhibits curvature of field in a direction perpendicular to the main-scanning direction, and corrects errors of reflecting facets of the deflector in the vertical direction. In this optical system, however, curvature of field and distortion in the main-scanning direction are not satisfactorily inhibited. For example, if priority is given to inhibition of distortion, curvature of field in the main-scanning direction becomes large, and as a result aberration with respect to the main-scanning direction cannot be sufficiently inhibited.

SUMMARY OF THE INVENTION

Therefore an object of the present invention is to provide a beam scanning optical system wherein an image surface can be flattened, and distortion and curvature of field on a light receiving surface are sufficiently inhibited within a wide range of field angle.

Another object of the present invention is to provide a beam scanning optical system wherein distortion and curvature of field can be sufficiently inhibited within a wide range of field angle, and uniform beam spots can be obtained in a main-scanning line.

In order to attain the objects above, a beam scanning optical system according to the present invention comprises light source means for emitting a light beam; converging means for converging the light beam emitted from the light source means into a straight line; deflection means for deflecting the light beam at an equiangular velocity, the deflection means being disposed in the vicinity where the light beam is converged into said straight line; a spherical mirror for collecting the deflected light beam on a beam receiving surface; and a lens disposed between the deflection means and the spherical mirror, the lens having at least one toroidal surface, a beam entrance side and a beam exit side of the lens being decentered in a direction of the beam scanning.

A toroidal surface means a surface of which two principal meridians have different centers of curvature. At least either the beam entrance side or the beam exit side of the lens is a toroidal surface, and the other side may be a spherical, flat or cylindrical surface.

In the beam scanning optical system of the structure above, a beam advances as follows. A beam emitted from the light source means is deflected at a constant angular velocity by the deflection means. The deflected beam transmits the lens and reflects on the spherical mirror, and the beam is collected on the beam receiving surface. The beam reflected from the spherical mirror is scanned at a constant speed, without speed difference between the center portion and the edge portions in a main-scanning line. Also, an image surface is flattened, and distortion is inhibited in a wide range of field angle on the beam receiving surface.

In the beam scanning optical system, the beam entrance side and the beam exit side of the lens may have different centers of curvature on the plane of deflection. Thereby asymmetric curvature of field and distortion in the main-scanning direction can be corrected.

In the beam scanning optical system, further the spherical mirror may be decentered in a direction perpendicular to the main-scanning direction, and the lens between the deflection means and the spherical mirror may have a toroidal surface on its beam entrance side and a spherical surface on its beam exit side, the spherical surface being decentered in a direction perpendicular to the main-scanning direction in respect to the toroidal surface.

BRIEF DESCRIPTION OF THE DRAWINGS

These and other objects and features of the present invention will be apparent from the following description taken in conjunction with preferred embodiments thereof with reference to the accompanying drawings, in which:

FIGS. 1 through 17 show a beam scanning optical system of a first embodiment according to the present invention;

FIG. 1 is a perspective view of the optical system showing the general constitution;

FIG. 2 is a plan view showing an optical path of the optical system on a plane of deflection;

FIGS. 3 through 6 are elevational views showing optical paths on a plane perpendicular to the plane of deflection when different lenses are used;

FIGS. 7 through 17 are graphs showing aberration on a photosensitive drum (beam receiving surface);

FIGS. 18 through 22 show a beam scanning optical system of a second embodiment according to the present invention;

FIG. 18 is a perspective view of the optical system showing the general constitution;

FIG. 19 is an elevational view showing an optical path of the optical system on a plane perpendicular to a plane of deflection; and FIG. 20 through 22 are graphs showing aberration on a photosensitive drum (beam receiving surface).

DETAILED DESCRIPTION OF THE PREFERRED EMBODIMENTS

Some exemplary beam scanning optical systems according to the present invention are hereinafter described in reference to the accompanying drawings.

First Embodiment: FIGS. 1–17

Figure 1:
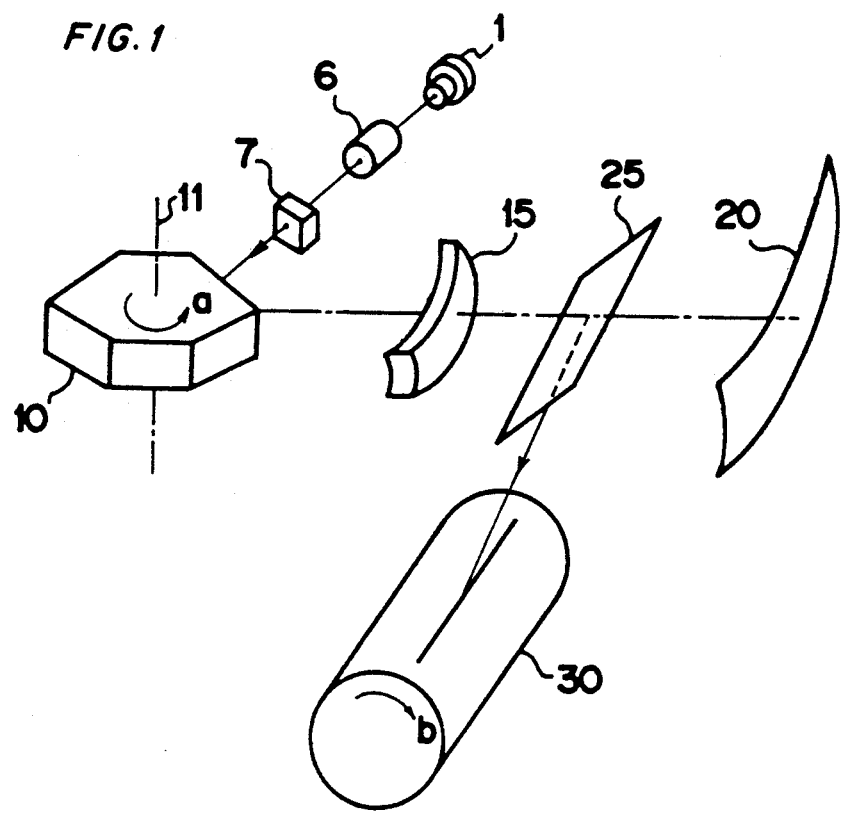

First referring to FIG. 1, essential components of a beam scanning optical system of a first embodiment are described. Numeral 1 denotes a semiconductor laser. Numeral 6 denotes a collimator lens. Numeral 7 denotes a cylindrical lens. Numeral 10 denotes a polygon mirror. Numeral 15 denotes a toric lens. Numeral 25 denotes a beam splitter. Numeral 20 denotes a spherical mirror. Numeral 30 denotes a photosensitive drum.

The semiconductor laser 1 is intensively modulated (turned on and off) on orders of a control circuit (not shown), such that the laser 1 emits a divergent pencil of rays carrying image information. The divergent pencil of rays is changed to a convergent pencil of rays by transmission through the collimator lens 6. Further, the convergent pencil of rays transmits through the cylindrical lens 7, whereby the pencil of rays enters the polygon mirror 10 in the form of almost a line extending on a plane of deflection by the polygon mirror 10. The polygon mirror 10 is rotated on a shaft 11 by a motor (not shown) in a direction indicated by arrow a at a constant speed. Thereby the pencil of rays which have been transmitted through the cylindrical lens 7 reflect on facets of the polygon mirror 10 and are deflected at a constant angular velocity. The pencil of rays after the deflection transmits through the toric lens 15 and the beam splitter 25, and is then reflected on the concave side of the spherical mirror 20. The reflected pencil of rays enters the beam splitter 25 and is directed to the photosensitive drum 30. The pencil of rays is scanned on the drum 30 in the direction parallel with the axis of the drum 30 in accordance with the rotation of the polygon mirror 10. The scanning in the direction parallel with the axis of the drum 30 is hereinafter referred to as main-scanning. The drum 30 is rotated in a direction indicated by arrow b at a constant speed, and scanning in accordance with this rotation is hereinafter referred to as sub-scanning.

Figure 2:
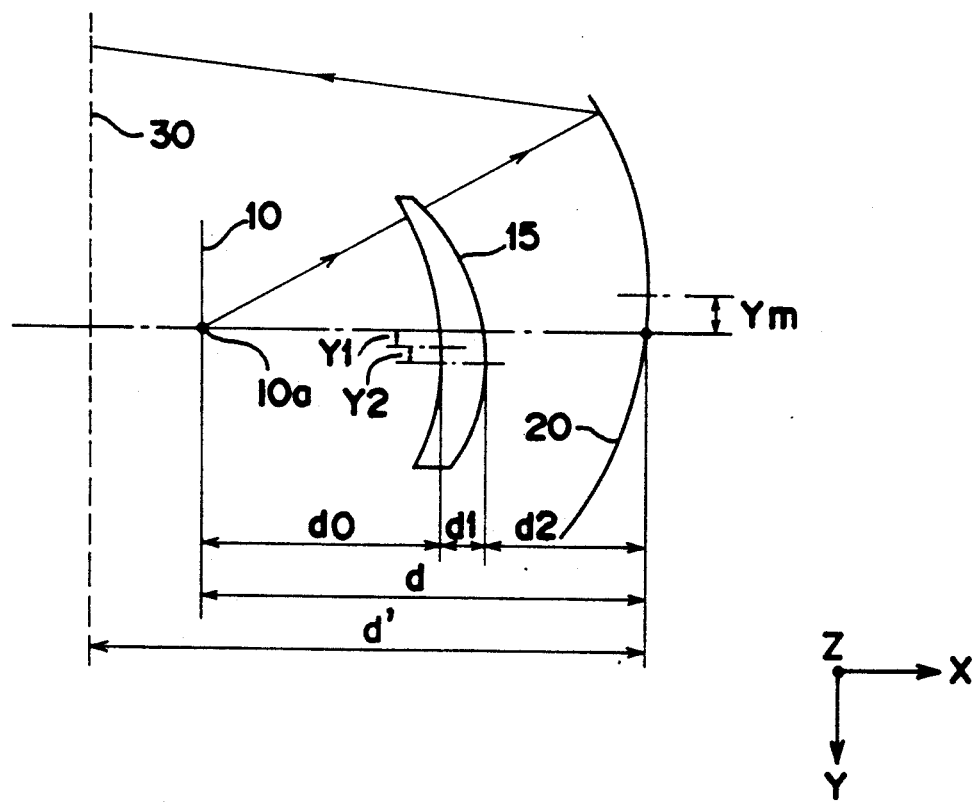
Figure 3:
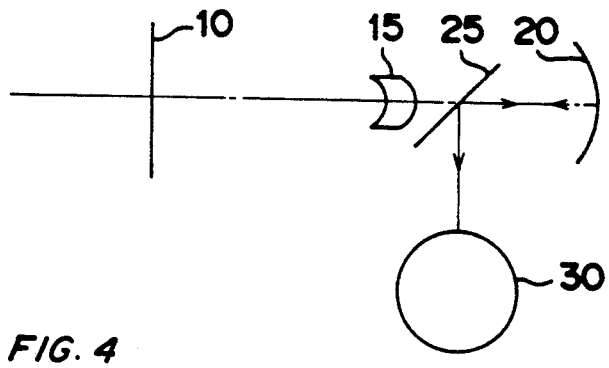
Figure 4:
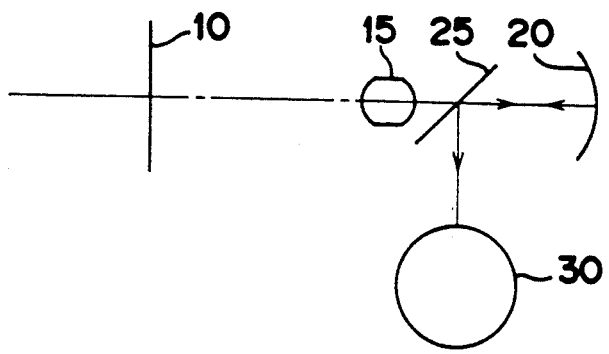
Figure 5:
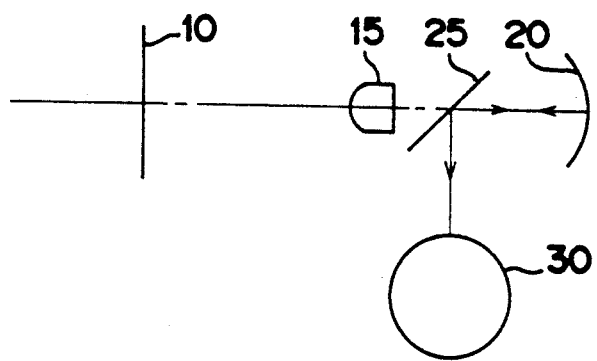
Figure 6:
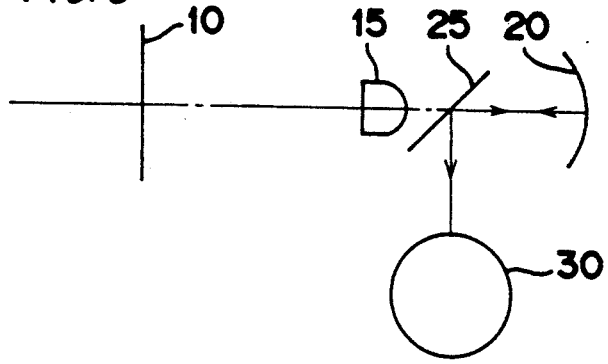

Now the toric lens 15 is described. One side of the toric lens 15 (either the ray entrance side or the ray exit side) is a toroidal surface, and the other side thereof is a spherical, flat or cylindrical surface. A toroidal surface means a surface of which two principal meridians have different centers of curvature. FIGS. 2 and 3 show a toric lens whose entrance side is a spherical surface and whose exit side is a toroidal surface. The toric lens 15 of the optical system may be in any shape as long as it meets the definition above. FIG. 4 shows an optical system containing a toric lens whose entrance side and exit side are a toroidal surface and a spherical surface respectively. FIG. 5 shows an optical system containing a toric lens whose entrance side and exit side are a toroidal surface and a cylindrical surface respectively. FIG. 6 shows an optical system containing a toric lens whose entrance side and exit side are a cylindrical surface and a toroidal surface respectively.

In the beam scanning optical system of such a structure, an electrostatic latent image is formed on the photosensitive drum 30 with the intense modulation of the semiconductor laser 1, and the main-scanning and the sub-scanning of the beam. The spherical mirror 20, which replaced an fΘ lens, adjusts the main-scanning speed in cooperation with the toric lens 15 so as to inhibit aberration, namely distortion at the edge portion and curvature of field in respect to the main-scanning direction on the photosensitive drum 30.

The toroidal surface of the toric lens 15 which is disposed in the optical path of the reflected rays from the polygon mirror 10 corrects errors of the reflecting facets of the polygon mirror 10, and inhibits curvature of field on the photosensitive drum 30 in respect to the sub-scanning direction. When the reflecting facets of the polygon mirror 10 do not have exactly the same angle in respect to the vertical direction, a scanning line is dislocated on the drum 30 in the sub-scanning direction, which results in uneven pitch of an image. Even when the polygon mirror 10 has such errors, the scanning line dislocation on the drum 30 can be inhibited by correcting the direction of rays reflected from the reflecting facets of the polygon mirror 10. That is, a lens to correct the direction of rays reflected from the polygon mirror 10 should be disposed so that the reflecting facets of the polygon mirror 10 will conjugate the surface of the drum 30. In this first embodiment, the cylindrical lens 7 functions to transform a pencil of rays, and the toroidal surface of the toric lens 15 functions to maintain a conjugate relationship between the reflecting facets of the polygon mirror 10 and the surface of the photosensitive drum 30. The other side (spherical or cylindrical surface) of the toric lens 15 mainly inhibits curvature of field in the main-scanning direction and also inhibits distortion.

Curvatures of the entrance side and the exit side of the toric lens 15 on the plane of deflection by the polygon mirror 10 have appropriate values of radiuses for flattening an image surface perpendicular to the plane of deflection, that is, inhibiting curvature of field on the drum 30 in the sub-scanning direction. Specific values will be suggested in the experiment described later (refer to R1$a$, R1$b$, R2$a$ and R2$b$). Further, it is preferred that the entrance side and the exit side of the toric lens 15 are decentered in the main-scanning direction. Referring to FIG. 2, the entrance side and the exit side of the toric lens 15 are decentered in the direction Y by amounts Y1 and Y2 respectively. This decentering of the toric lens 15 enables the lens 15 to comply with asymmetrical curvature of field and distortion in respect to the main-scanning direction. As a result, curvature of field and distortion are on the whole more inhibited. Decentering of the spherical mirror 20 in the main-scanning direction (referenced by Ym in FIG. 2) brings the same effect. As the decentering amounts Y1, Y2 and Ym, specific values will be suggested in a description of experimental examples I through XI.

In this first embodiment, the collimator lens 6 changes a divergent pencil of rays to a convergent pencil of rays. This is to inhibit curvature of field on the surface of the photosensitive drum 30. Whether a convergent pencil of rays or a divergent pencil of rays enters the polygon mirror 10 or any other rotating deflector, as long as no optical members are provided in the optical system after the polygon mirror 10, the pencil of rays reflected from the polygon mirror 10 spread in an arc serving the reflection point as the center, that is, the image points of the rays are in an arc. However, when the rays are received on a straight line, curvature of field occurs. When a convergent pencil of rays enters the polygon mirror 10, curvature of field which is concave, viewed from the entrance side, occurs. In accordance with the degree of convergence of the pencil of rays entering the polygon mirror 10, the distance between the spherical mirror 20 and the image surface of the rays changes, and accordingly the degree of the curvature of field on the drum 30 changes. The curvature of field caused by reflecting a convergent pencil of rays on the polygon mirror 10 and the curvature of field caused by the spherical mirror 20 are set off against each other, thereby flattening the image surface and inhibiting curvature of field on the photosensitive drum 30.

As the curvature of field becomes small, the beam diameter on the photosensitive drum 30 does not vary much from position to position, which widens the field angle of the optical system. Also, since the beam diameter on the drum 30 is small, a high pitch picture can be obtained.

FIG. 2 shows an optical path on the plane of deflection. Referring to FIG. 2, positional relationships between the polygon mirror 10, the toric lens 15 and the spherical mirror 20 are hereinafter described. The following inequality (1) shows a desired relationships between distance s (not shown) from a deflection point 10a of the polygon mirror 10 to a point where a convergent pencil of rays from the collimator lens 6 images (image point) if the toric lens 15 and the spherical lens 20 are not provided and a radius of curvature Rm of the spherical mirror 20. Inequality (2) shows a desired relationships between distance d from the deflection point 10a to the spherical mirror 20 and the radius of curvature Rm. Inequality (3) shows a desired relationships between thickness d1 of the toric lens 15 on the optical axis, a radius of curvature R1a of the entrance side of the lens 15 on the plane of deflection and a radius of curvature R2a of the exit side of the lens 15 on the plane of deflection.

$$s/|Rm| > 0.4 \quad (1)$$

$$0.1 < d/|Rm| < 0.7 \quad (2)$$

$$0.6 < (|R1a| - d1)/R2a < 1.3 \quad (3)$$

In FIG. 2, d' denotes distance from the spherical mirror 20 to the photosensitive drum 30, d0 denotes distance from the deflection point 10a to the entrance side of the toric lens 15, and d2 denotes distance from the exit side of the toric lens 15 to the spherical mirror 20.

When the lens 15, and the mirrors 10 and 20 fulfill the conditions indicated by the inequalities (1), (2) and (3), distortion can be inhibited over a wide range of field angle, and the image surface can be flattened. The values in the inequalities (1), (2) and (3) which limit tolerances were determined by experiment.

Referring to inequality (1), when the value s/|Rm| is less than the lower limit (0.4), the image surface and the spherical mirror 20 are too close to arrange the photosensitive drum 30 and the spherical mirror 20 appropriately, and distortion becomes large.

Referring to inequality (2), when the value d/|Rm| is less than the lower limit (0.1), positive distortion develops with an increase of the angle of deflection, which results in an elongation of an image at both sides in respect to the main-scanning direction (around the starting and ending positions of main-scanning). When the value d/|Rm| exceeds the upper limit (0.7), negative distortion develops with an increase of the angle of deflection, which results in shrinkage of an image at both sides in respect to the main-scanning direction, and curvature of field becomes large.

Referring to inequality (3), when the value (|R1a|+d1)/|R2a| is not within the tolerance, curvature of field becomes large.

We made an experiment in different conditions as tabulated below.

TABLE

| | | Experimental Examples | | | | | |
|---|---|---|---|---|---|---|---|
| | | I | II | III | IV | V | VI |
| Surfaces of toric lens | Entrance side | T | S | S | C | S | S |
| | Exit side | S | T | T | T | T | T |
| Inscribed circle diameter on polygon mirror (mm) | | 30 | 20 | 47 | 40 | 20 | 47 |
| Rm (mm) | | −335 | −235 | −210 | −340 | −265 | −210 |
| s (mm) | | 451.9 | 122 | 136.5 | 853 | 276.7 | 146.7 |
| d (mm) | | 100 | 90 | 60 | 42 | 80 | 60 |
| d0 (mm) | | 42 | 45 | 20 | 100 | 30 | 25 |
| d1 (mm) | | 8 | 5 | 10 | 8 | 10 | 5 |
| d2 (mm) | | 50 | 40 | 30 | 42 | 40 | 30 |
| d' (mm) | | 115 | 55 | 61 | 132 | 85 | 61 |
| R1a (mm) | | −55 | −38 | −35 | −66 | −50 | −35 |
| R1b (mm) | | +28.06 | −38 | −35 | ∞ | −50 | −35 |
| R2a (mm) | | −57 | −63 | −43 | −66 | −51 | −44 |
| R2b (mm) | | −57 | −12.9 | −10.0 | −21.5 | −12.95 | −9.8 |
| Refraction index of toric lens | | 1.48457 | 1.48457 | 1.51118 | 1.48457 | 1.48457 | 1.51118 |
| Y1 (mm) | | 2.5 | 2.7 | 1.5 | 1.5 | 1.0 | 1.5 |
| Y2 (mm) | | 1.5 | 0.5 | 3.5 | 2.6 | 1.2 | 3.0 |
| Ym (mm) | | −0.5 | −3.0 | −2.0 | −0.5 | −1.2 | −2.0 |
| s/Rm | | 1.3 | 0.5 | 0.7 | 2.4 | 1.0 | 0.7 |
| d/Rm | | 0.3 | 0.4 | 0.3 | 0.3 | 0.3 | 0.3 |
| (R1a − d1)/R2a | | 1.1 | 0.7 | 1.1 | 1.1 | 1.2 | 0.91 |

| Experimental Examples | | | | |
|---|---|---|---|---|
| VII | VIII | IX | X | XI |

TABLE-continued

| Surfaces of toric lens | Entrance side | T | S | C | T | T |
|---|---|---|---|---|---|---|
| | Exit side | S | T | T | S | C |
| Inscribed circle diameter on polygon mirror (mm) | | 30 | 47 | 40 | 20 | 23.5 |
| Rm (mm) | | −320 | −440 | −340 | −190 | −180 |
| s (mm) | | 616.9 | 517.9 | 822 | 147.5 | 172.2 |
| d (mm) | | 100 | 240 | 42 | 60 | 57 |
| d0 (mm) | | 40 | 50 | 100 | 42 | 42 |
| d1 (mm) | | 10 | 10 | 8 | 8 | 5 |
| d2 (mm) | | 50 | 50 | 42 | 10 | 10 |
| d' (mm) | | 115 | 180 | 132 | 55 | 55 |
| R1a (mm) | | −55 | −66 | −66 | −48 | −50 |
| R1b (mm) | | −27.4 | −66 | ∞ | 19.3 | 15.8 |
| R2a (mm) | | −54 | −74 | −66 | −63 | −60 |
| R2b (mm) | | −54 | −20.4 | −21.5 | −63 | ∞ |
| Refraction index of toric lens | | 1.48457 | 1.51118 | 1.48457 | 1.48457 | 1.48457 |
| Y1 (mm) | | 2.5 | 2.0 | 2.3 | 2.6 | 2.2 |
| Y2 (mm) | | 1.5 | 1.5 | 0 | 0 | 0 |
| Ym (mm) | | +1.0 | 0 | −2 | −2 | −2 |
| s/∣Rm∣ | | 1.9 | 1.2 | 2.4 | 0.8 | 0.9 |
| d'/Rm | | 0.3 | 0.55 | 0.3 | 0.3 | 0.3 |
| (R1a − d1)/R2a | | 1.2 | 1.03 | 1.1 | 0.9 | 0.9 |

Regarding surfaces of toric lens, "T", "S" and "C" represent a toroidal surface, a spherical surface and a cylindrical surface respectively. "R1b" is the radius of curvature of the entrance side of toric lens on a plane perpendicular to the plane of deflection, and "R2b" is the radius of curvature of the exit side of toric lens on a plane perpendicular to the plane of deflection.

FIG. 7 through 17 show aberration on the photosensitive drum 30 in the experimental examples I through XI respectively. The graphs (a) plot angle of deflection (axis of abscissas) versus degree of distortion (axis of ordinates). The graphs (b) plot angle of deflection (axis of abscissas) versus degree of curvature of field (axis of ordinates). In each of the graphs (b), the dotted line shows curvature of field in the main-scanning direction caused by curvature of field on the plane of deflection by the polygon mirror 10, and the solid line shows curvature of field in the sub-scanning direction caused by curvature of field on a plane perpendicular to the plane of deflection.

Second Embodiment: FIGS. 18-22

Figure 18:
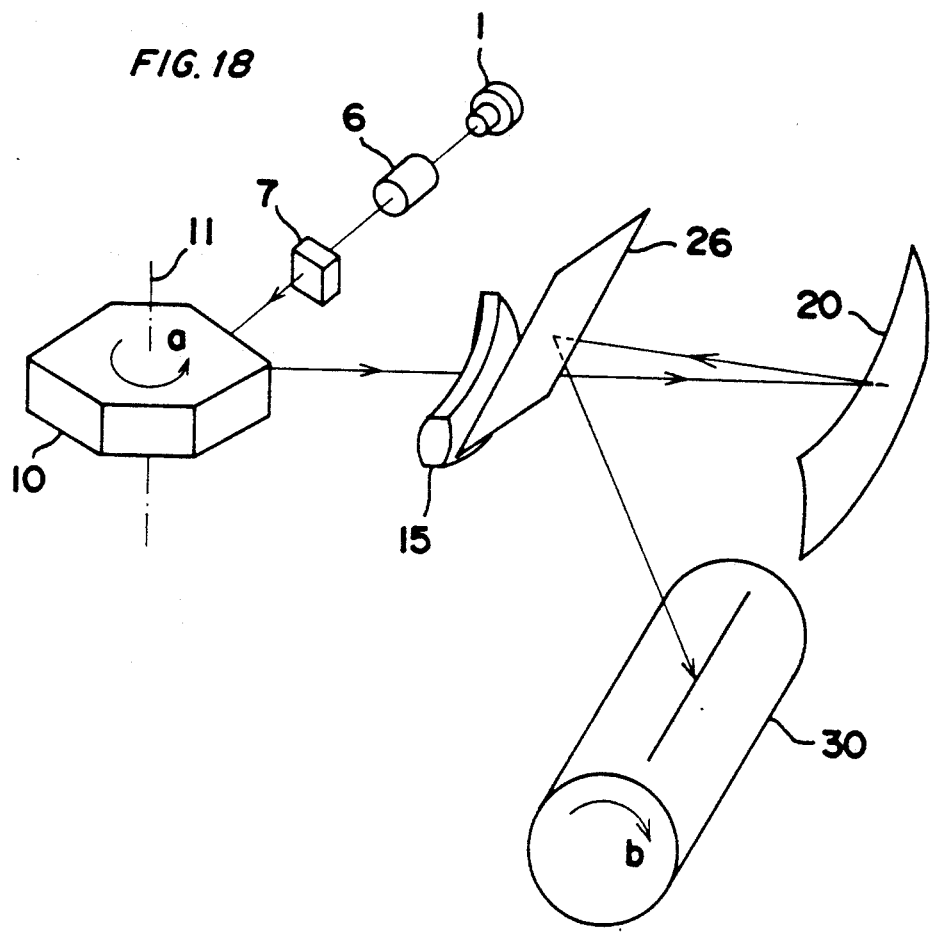

FIG. 18 shows essential components of a beam scanning optical system of a second embodiment. The optical system comprises a semiconductor laser 1, a collimator lens 6, a cylindrical lens 7, a polygon mirror 10, a toric lens 15, a spherical mirror 20, a plane mirror 26, and a photosensitive drum 30. Except for the plane mirror 26, all the components have the same structures and functions as the components referenced by the same numbers in the first embodiment. FIG. 2, which was referenced in the description of the first embodiment, also shows an optical path on a plane of deflection in this second embodiment.

In the second embodiment, a pencil of rays reflects on the reflecting facets of the polygon mirror 10 and is deflected at a constant angular velocity. Then, the rays transmit the toric lens 15 and reflect on the concave side of the spherical mirror 20. Further, the rays reflect on the plane mirror 26 and are directed to the photosensitive drum 30. The entrance side of the toric lens 15 is a toroidal surface, and the exit side thereof is a spherical surface.

The toric lens 15 functions the same as in the first embodiment. Curvatures of the entrance side and the exit side of the toric lens 15 on the plane of deflection have appropriate values of radiuses for flattening an image surface perpendicular to the plane of deflection, that is, inhibiting curvature of field on the drum 30 in the sub-scanning direction. Specific values will be suggested in the experiment described later (refer to R1a, R1b, R2a and R2b). Also, it is preferred that the entrance side and the exit side of the toric lens 15 are decentered in the main-scanning direction. Referring to FIG. 2, the entrance side and the exit side of the toric lens 15 are decentered in the direction Y by amounts Y1 and Y2 respectively. This decentering of the toric lens 15 enables the lens 15 to comply with asymmetrical curvature of field and distortion in respect to the main-scanning direction. In result, curvature of field and distortion are on the whole more inhibited. Decentering of the spherical mirror 20 in the main-scanning direction (referenced by Ym in FIG. 2) brings the same effect. As the decentering amounts Y1, Y2 and Ym, specific values will be suggested in a description of experimental examples XII, XIII and XIV.

Figure 19:
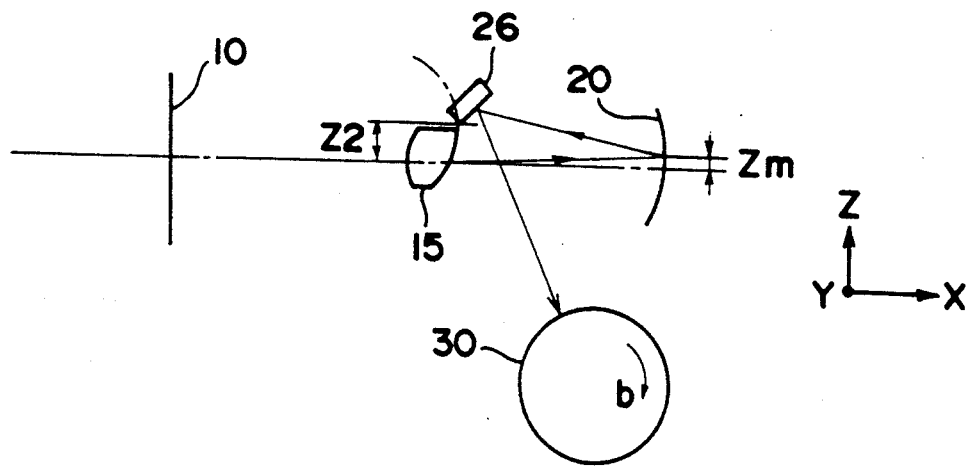

Referring to FIG. 19, the spherical mirror 20 is also decentered in the sub-scanning direction, namely, decentered in the direction Z by an amount Zm. This decentering is to form a reflection angle. If an incident ray to the spherical mirror 20 is reflected therefrom and turns back the way, a semitransparent member such as a beam splitter is required so as to direct the reflected ray to the photosensitive drum 30. However, semitransparent members are difficult to plan and process, and greatly attenuates quantity of light. For these reasons, this second embodiment provides an optical system which does not require a transparent member. Specifically, the spherical mirror 20 is decentered in the sub-scanning direction by the amount Zm so that reflected rays from the mirror 20 will advance in different directions from those incident rays come from. The reflected rays further reflect on the mirror 26, and advance to the photosensitive drum 30.

However, if only the spherical mirror 20 is decentered in the direction Z, a scanning line on the drum 30 is curved. In order to make the scanning line straight, the toric lens 15 is so disposed that its exit side (spherical surface) is decentered in the direction Z by an amount Z2 in relation to its entrance side (toroidal surface). Also, the toroidal surface and the cylindrical lens 7 have a common generatrix, which guarantees uniform beam spots in a main-scanning line on the drum 30. Specific values of the decentering amounts Zm and Z2 will be suggested in the following experimental examples XII, XIII and XIV.

We made an experiment in different conditions as tabulated below.

TABLE

|  | Experimental Examples | | |
| --- | --- | --- | --- |
|  | XII | XIII | XIV |
| Inscribed circle diameter on polygon mirror (mm) | 30 | 30 | 20 |
| Rm (mm) | −340 | −340 | −305 |
| s (mm) | 460.4 | 707.1 | 296 |
| d (mm) | 100 | 100 | 93 |
| d0 (mm) | 42 | 42 | 40 |
| d1 (mm) | 8 | 5 | 5 |
| d2 (mm) | 50 | 40 | 48 |
| d' (mm) | 115 | 130 | 103 |
| R1a (mm) | −55 | −55 | −52 |
| R1b (mm) | +28.75 | +28.75 | +24.5 |
| R2a (mm) | −57 | −57 | −63 |
| R2b (mm) | −57 | −57 | −63 |
| Refraction index of toric lens | 1.48457 | 1.48457 | 1.48457 |
| Y1 (mm) | 2.25 | 2.25 | 2.0 |
| Y2 (mm) | 1.0 | 1.0 | 1.0 |
| Z2 (mm) | 7.4 | 7.4 | 6.0 |
| Ym (mm) | 0 | 0 | −2.0 |
| Zm (mm) | 4.0 | 3.4 | 3.0 |
| s/|Rm| | 1.4 | 2.1 | 1.0 |
| d/|Rm| | 0.3 | 0.3 | 0.3 |
| (|R1a|+d1)/|R2a| | 1.1 | 1.1 | 0.9 |

In the second embodiment, desired relationships between the polygon mirror 10, the toric lens 15 and the spherical mirror 20 can be indicated by the inequalities (1), (2) and (3) described in the first embodiment. Like FIGS. 7 through 17, FIGS. 20, 21 and 22 show aberration on the surface of the photosensitive drum 30, and the graphs (a) and (b) show distortion and curvature of field, respectively. The graph (c) plots angle of deflection (axis of abscissas) versus converging point on the drum 30 in respect to the sub-scanning direction (axis of ordinates). In other words, each of the graphs (c) shows dislocation of a scanning line or curvature of the scanning line in a direction perpendicular to the plane of deflection (in the sub-scanning direction).

Other Embodiments

Although the present invention has been described in connection with the preferred embodiments above, it is noted that various changes and modifications will be apparent to a person skilled in the art. Such changes and modifications are to be understood as being within the scope of the present invention defined by the appended claims.

For example, any other deflector may be employed instead of the polygon mirror 10, as long as it can deflect a pencil of rays on a plane at a constant angular velocity. Although a semiconductor laser is used as a light source in the embodiments above, any other laser emitting means or a point light source may be used instead.

Further, it is not required to change a divergent pencil of rays emitted from the semiconductor laser to a convergent pencil of rays, and the divergent pencil of rays may be changed to a parallel pencil of rays.

Regarding the second embodiment, in order to direct rays reflected from the spherical mirror 20 to the photosensitive drum 30, not only a single plane mirror 26 but also a plurality of plane mirrors may be provided. Alternatively, the spherical mirror 20 should be provided such that rays reflected therefrom can advance to the photosensitive drum 30 directly, which eliminates the necessity of the plane mirror 26.

What is claimed is:

1. A beam scanning optical system comprising:
   light source means for emitting a light beam;
   deflection means for deflecting the light beam periodically in a plane of deflection;
   a spherical mirror for directing the deflected light beam towards a beam receiving surface such that said light beam on the beam receiving surface moves along a scanning line; and
   a lens for refracting said deflected light beam so that the light beam moves at a constant velocity on the scanning line, the lens being disposed between the deflection means and the spherical mirror and having at least one toroidal surface, a center of curvature of a beam entrance side and a center of curvature of a beam exit side of the lens being offset from each other in a direction of the beam scanning line.

2. The beam scanning optical system of claim 1, wherein the system fulfills a condition indicated by the following inequality:

$$s/|Rm| > 0.4$$

wherein s is distance from a point of deflection to an image point, and Rm is a radius of curvature of the spherical mirror.

3. The beam scanning optical system of claim 1, wherein the system fulfills a condition indicated by the following inequality:

$$0.1 < d/|Rm| < 0.7$$

wherein d is distance from a point of deflection to the spherical mirror, Rm is a radius of curvature of the spherical mirror.

4. The beam scanning optical system of claim 1, wherein the system fulfills a condition indicated by the following inequality:

$$0.6 < (|R1a| + d1)/|R2a| < 1.3$$

wherein d1 is thickness of the lens, R1a is a radius of curvature of the entrance side of the lens on a plane of deflection, R2a is a radius of curvature of the exit side of the lens on the plane of deflection.

5. The beam scanning optical system of claim 1, wherein the light source means includes a semiconductor laser.

6. The beam scanning optical system of claim 1, further comprising converging means for imaging the light beam emitted from the light source means upon the deflection means in a linear form.

7. The beam scanning optical system of claim 6, wherein the converging means includes a cylindrical lens.

8. The beam scanning optical system of claim 1, wherein the deflection means includes a polygon mirror.

9. The beam scanning optical system of claim 1, further comprising an optical member between the lens and the spherical mirror, the optical member directing the light beam from the lens to the spherical mirror and directing the light beam reflected from the spherical mirror to the beam receiving surface.

10. A beam scanning optical system comprising:
light source means for emitting a light beam;
deflection means for deflecting the light beam periodically in a plane of deflection;
a spherical mirror for guiding the deflected light beam on a beam receiving surface such that said light beam guided on the beam receiving surface moves on a scanning line; and
a lens for refracting said deflected light beam so that the light beam moves at a constant velocity on the scanning line, the lens being disposed between the deflection means and the spherical mirror and having at least one toroidal surface, a beam entrance side and a beam exit side of the lens having different centers of curvature on the plane of deflection.

11. The beam scanning optical system of claim 10, wherein the system fulfills a condition indicated by the following inequality:

$$s/|Rm| > 0.4$$

wherein s is distance from a point of deflection to an image point, and Rm is a radius of curvature of the spherical mirror.

12. The beam scanning optical system of claim 10, wherein the system fulfills a condition indicated by the following inequality:

$$0.1 < d/|Rm| < 0.7$$

wherein d is distance from a point of deflection to the spherical mirror, Rm is a radius of curvature of the spherical mirror.

13. The beam scanning optical system of claim 10, wherein the system fulfills a condition indicated by the following inequality:

$$0.6 < (|R1a| + d1)/|R2a| < 1.3$$

wherein d1 is thickness of the lens, R1a is a radius of curvature of the entrance side of the lens on a plane of deflection, R2a is a radius of curvature of the exit side of the lens on the plane of deflection.

14. The beam scanning optical system of claim 10, wherein the light source means includes a semiconductor laser.

15. The beam scanning optical system of claim 10, further comprising converging means for imaging the light beam emitted from the light source means upon the deflection means in a linear form.

16. The beam scanning optical system of claim 15, wherein the converging means includes a cylindrical lens.

17. The beam scanning optical system of claim 10, wherein the deflection means includes a polygon mirror.

18. The beam scanning optical system of claim 10, further comprising an optical member between the lens and the spherical mirror, the optical member directing the light beam from the lens to the spherical mirror and directing the light beam reflected from the spherical mirror to the beam receiving surface.

19. A beam scanning optical system comprising:
light source means for emitting a light beam;
deflection means for deflecting the light beam periodically in a plane of deflection;
a spherical mirror for guiding the deflected light beam on a beam receiving surface such that said light beam guided on the beam receiving surface moves on a scanning line; and
a lens for refracting said deflected light beam so that the light beam moves at a constant velocity on the scanning line, the lens being disposed between the deflection means and the spherical mirror and having a spherical surface and a toroidal surface, a center of the spherical surface being off the plane of deflection.

20. The beam scanning optical system of claim 19, wherein the system fulfills a condition indicated by the following inequality:

$$s/|Rm| > 0.4$$

wherein s is distance from a point of deflection to an image point, and Rm is a radius of curvature of the spherical mirror.

21. The beam scanning optical system of claim 19, wherein the system fulfills a condition indicated by the following inequality:

$$0.1 < d/|Rm| < 0.7$$

wherein d is distance from a point of deflection to the spherical mirror, Rm is a radius of curvature of the spherical mirror.

22. The beam scanning optical system of claim 19, wherein the system fulfills a condition indicated by the following inequality:

$$0.6 < (|R1a| + d1)/|R2a| < 1.3$$

wherein d1 is thickness of the lens, R1a is a radius of curvature of the entrance side of the lens on a plane of deflection, R2a is a radius of curvature of the exit side of the lens on the plane of deflection.

23. The beam scanning optical system of claim 19, wherein the light source means includes a semiconductor laser.

24. The beam scanning optical system of claim 19, wherein the converging means includes a cylindrical lens.

25. The beam scanning optical system of claim 19, wherein the deflection means includes a polygon mirror.

26. The beam scanning optical system of claim 19, further comprising an optical member for directing the light beam reflected from the spherical mirror to the beam receiving surface.

27. A beam scanning optical system comprising:
light source means for emitting a light beam;
deflection means for deflecting the light beam periodically in a plane of deflection;
a spherical mirror for reflecting the deflected light beam towards a beam receiving surface such that said light beam will move on a scanning line across the beam receiving surface, a center of the spherical mirror being positioned off the plane of deflection; and
a lens for refracting said deflected light beam so that the light beam moves at a constant velocity on the scanning line, the lens being disposed between the deflection means and the spherical mirror and having at least one toroidal surface.

28. The beam scanning optical system of claim 27, wherein the lens has a toroidal surface on its beam entrance side and a spherical surface on its beam exit side, and a center of curvature of the spherical surface is off the plane of deflection.

* * * * *